May 2, 1933. J. W. LEIGHTON 1,907,073
SPRING END BEARING SUPPORT
Filed Dec. 21, 1931

Inventor.
John Wycliffe Leighton

UNITED STATES PATENT OFFICE

JOHN WYCLIFFE LEIGHTON, OF PORT HURON, MICHIGAN

SPRING END BEARING SUPPORT

Application filed December 21, 1931. Serial No. 582,320.

The principal objects of this invention are, to simplify and cheapen the cost of end bearing supports for vehicle springs, and to provide such a support in which the lubrication of the bearing surfaces will be very effectively maintained.

The principal feature of the invention consists in the novel arrangement of a threaded bearing bolt supporting the load in a threaded bushing mounted in the spring end and rotatable on the threaded surfaces, the ends of the bolt being fixed in the load carrying members.

In the accompanying drawing, Figure 1 is a vertical longitudinal mid-sectional view through a spring end and the load supporting bracket carrying the bearing bolt.

In the development of spring suspensions for vehicles it has been found desirable to utilize threaded bearing surfaces for the pivot connections of the springs with the supported load and it is highly desirable that the load be supported by the underside of the bolt to enhance the lubricating condition.

There is in such bearing supports a very small movement between the wearing surfaces or points of contact and when the contact is against the underside of the bolt throughout its bearing surface the clearance spaces arranged above the contact points retain the lubricant and permit it to feed downward to the bearing points. In accomplishing this result the threaded bolt is secured in the load carrying member and rotates freely in the spring bearing.

Figure 1:
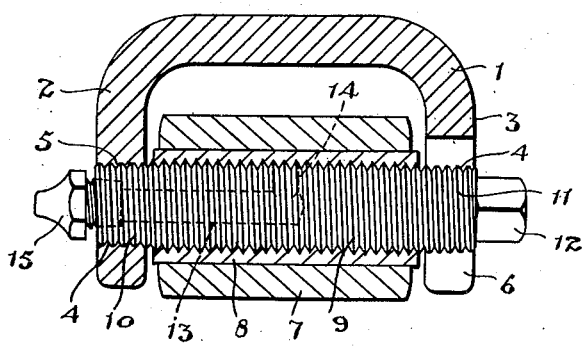
Figure 2:
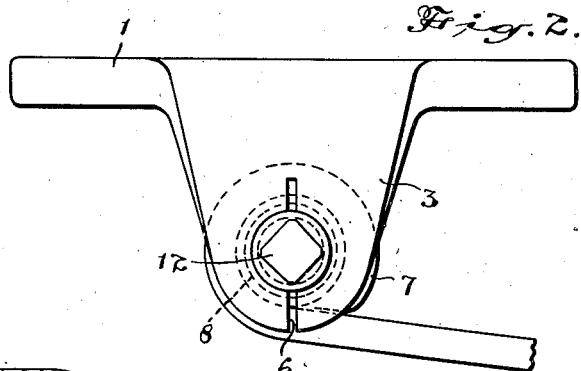
Figure 2 is a side elevational view of the device shown in Figure 1.

In the form shown in Figure 1 the bracket 1 is secured to the vehicle frame and is provided with downwardly extending parallelly arranged lugs 2 and 3. These lugs are bored and threaded with a thread 4 having a flat bottom 5.

One lug 3 is provided with a vertical slot 6 extending across the threaded hole.

The spring eye 7 is here shown provided with a threaded bushing 8 which is secured therein in any suitable manner and a bolt 9 threaded throughout its length extends through the bushing and is in loose or rotatable threaded engagement therewith.

The tops of the threads of the end portions 10 and 11 of the bolt are preferably cut down to substantially the diameter of the flat bottomed threads in the holes 2 and 3, and as these ends are a snug fit in the threaded bracket ends, when the bolt is threaded into said lugs the fully threaded portion of the centre will not enter the threaded holes of the bracket, consequently when the bolt is placed in position it will be held there securely so that it cannot turn.

In placing this bolt in position the end 10 thereof is threaded into the slotted hole of the lug 3 and when the larger diameter presented by the thread of the central portion of the bolt engages the threads of the slotted lug the lug sections spring apart a sufficient distance to allow the larger thread to work therethrough, but immediately the larger central portion has passed through the slotted lug, the lug sections close together to snugly embrace the reduced threaded end portion 11. The other end, having passed through the bushing, extends into the threaded lug 2 until the larger diameter central thread jams against the constricted thread of the hole.

The bolt is preferably provided at one end with a squared extension 12 to permit of its being turned with a wrench and the opposite end of the bolt is bored longitudinally to a point midway of its length, the longitudinal passage 13 connecting with a lateral passage 14 extending to the threaded surfaces to convey a lubricant to the threads and a suitable lubricant fitting 15 is secured in the end of the passage 13.

It will be readily understood that when the bolt is thus placed in position it will remain so placed until it is screwed out by sufficient force being exerted to spread the sections of the slotted end apart under tension.

Figure 3:
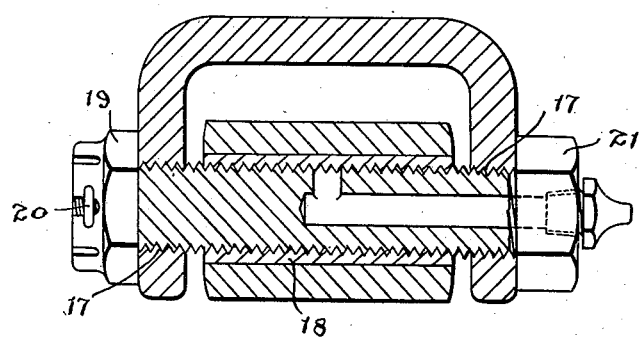
Figure 3 is a longitudinal mid-sectional view showing a modified form of the device.
Figure 4:
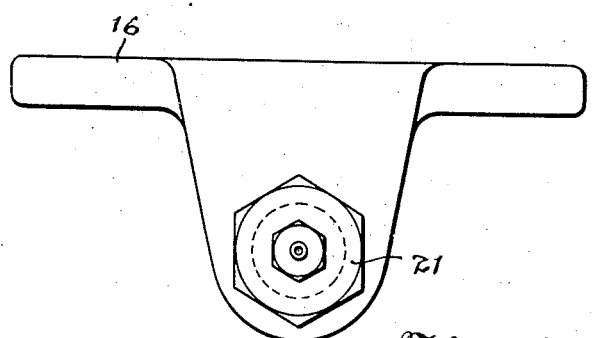
Figure 4 is a side elevational view of the device shown in Figure 3.

In the form illustrated in Figure 3 the lugs of the bracket 16 are provided with the threaded holes 17 approximately of the same diameter and pitch as the threads of the bushing 18.

The bolt is of greater length than the total width of the bracket and may be forged with a head on one end thereof of greater diameter than the threaded portion, or as is shown in the drawing a castellated nut 19 is threaded on to one end of the bolt and secured by a cotter pin 20 and a nut 21 is threaded on to the opposite end of the bolt projecting beyond the bracket and tightened to lock securely from rotation in the bracket.

In both forms of this invention, as herein shown, the bolt is secured from rotation in the bracket while the central portion thereof rotates freely in the eye end of the spring.

While two forms of this invention are herein shown it will be readily understood that other means which are the mechanical equivalent of those indicated may be adopted for securing the threaded bolt in the bracket lugs.

It will be appreciated that the construction described is extremely simple both to manufacture and install.

What I claim as my invention is:—

1. A spring end bearing support comprising a bracket having a pair of spaced lugs, a spring end having a threaded bearing arranged between said lugs, and a bolt having a threaded bearing surface engaging the threaded spring end and having its ends entering the lugs of said bracket, one or both of said lugs having a flat bottomed thread adapted to form a lock with the adjacent threads of the bolt to lock the latter against displacement in the bracket.

2. A spring end bearing support comprising a bracket having a pair of spaced lugs formed with aligned threaded holes, a spring end arranged between said lugs and having a threaded bearing surface, and a bolt threaded through the threaded holes of said bracket lugs and through said threaded spring bearing, one of said lugs being split to permit it to be tensioned on insertion of a bolt of predetermined diameter, said bolt having its thread presenting progressively different diameters to effect the tensioning of said split lug on the insertion of same whereby the bolt is locked in the bracket.

3. A spring end bearing support comprising a bracket having a pair of spaced lugs formed with aligned threaded holes, a spring end arranged between said lugs and having a threaded bearing surface, a bolt threaded through the threaded holes of said bracket lugs and through said threaded spring bearing, one of said lugs being split and tensioned by insertion of the bolt whereby the bolt is retained in position.

4. A spring end bearing support comprising a bracket having a pair of spaced lugs formed with aligned threaded holes, a spring end arranged between said lugs and having a threaded bearing surface, and a bolt threaded through the threaded holes of said bracket lugs and through said threaded spring bearing, one of said lugs being split to permit it to be tensioned on insertion of a bolt of predetermined diameter, and having flat-bottomed threads presenting an effective diameter less than that of the bushing-engaging threads of the bolt whereby the removal of said bolt is opposed by the tension set up in said split lug.

JOHN WYCLIFFE LEIGHTON.